J. W. JONES.
Green Corn Cutter.

No. 237,876.

Patented Feb. 15, 1881.

Witnesses:
Fred G. Dietrich
P. C. Dietrich

Inventor.
John Winslow Jones
by Daniel Breed
Attorney

UNITED STATES PATENT OFFICE.

JOHN WINSLOW JONES, OF PORTLAND, MAINE.

GREEN-CORN CUTTER.

SPECIFICATION forming part of Letters Patent No. 237,876, dated February 15, 1881.

Application filed September 18, 1879.

*To all whom it may concern:*

Be it known that I, JOHN WINSLOW JONES, of Portland, Maine, have invented a new and useful Improvement in Cutting Green Corn from the Cob and Splitting the Kernels; and I do hereby declare the following to be a full and correct description of the same, reference being had to the accompanying drawings, in which—

Figure 1:
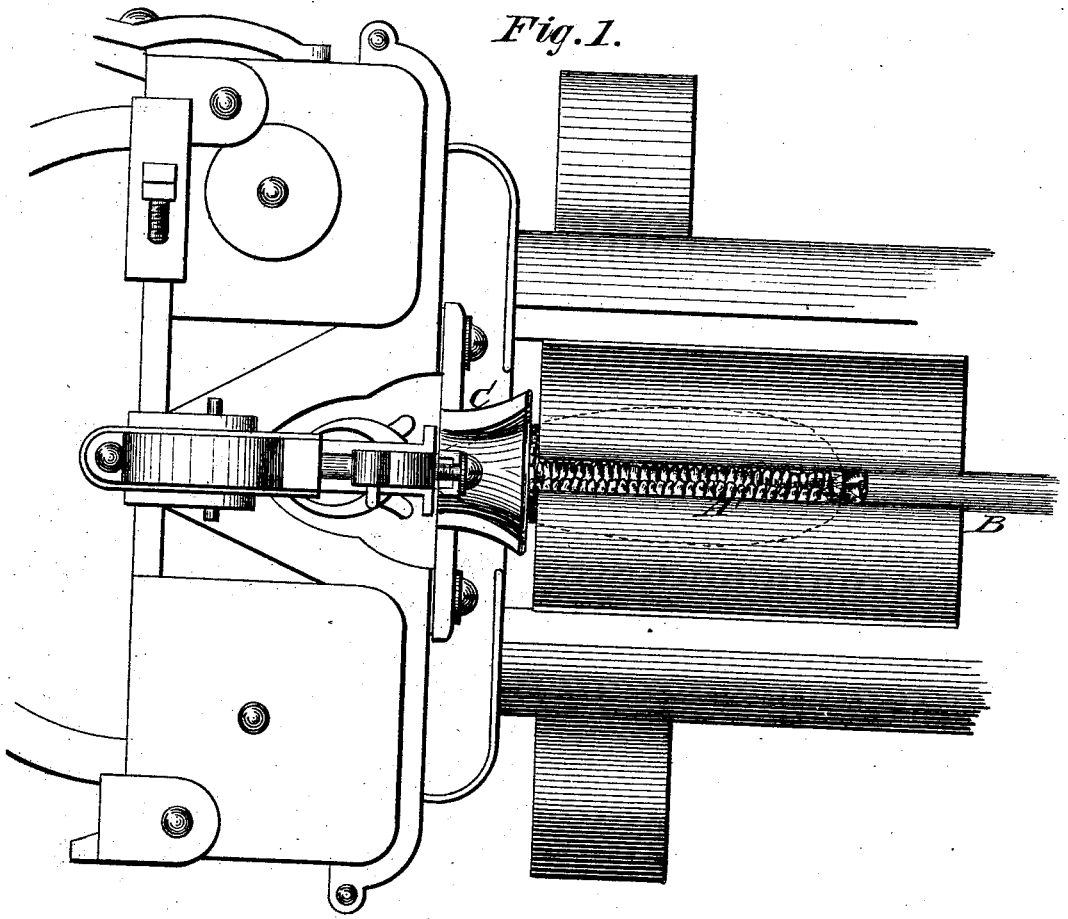
Figure 2:
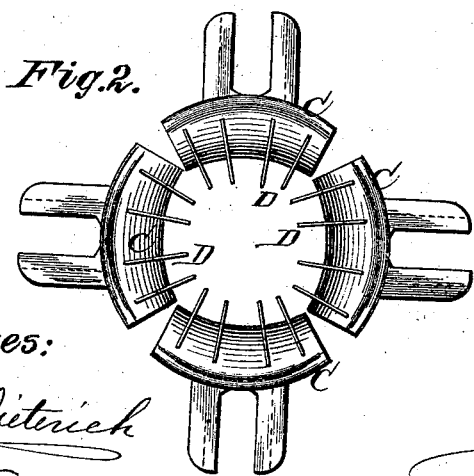
Figure 3:
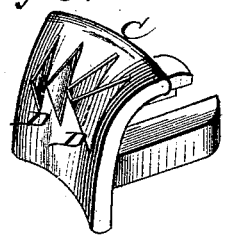

Figure 1 is a top view of knives employed in my machine and process. Fig. 2 is a front view of the circle of knives and the adjustable jaws. Fig. 3 is a detached perspective view of one of the jaws containing the knives.

My invention consists of a series of radial knives upon the inside of a circle or series of adjustable jaws in a machine for cutting the kernels of green corn from the cob.

Fig. 1 represents part of a machine for cutting green corn from the cob, and the position of the adjustable jaws C, upon the inside of which are the radial knives D, which are the chief object or device embraced in the present application. The ear of green corn is seen at A, the same being pushed forward by the plunger B, and thus entering the mouth of the machine between the circle or series of adjustable or expanding jaws C, which are provided with radial knives D, as shown in Fig. 2. As the ear of corn is pushed into the circle of knives the crowns of the kernels are split longitudinally while yet on the cob, and thus the milk or juice therein is freely liberated to flow away from the solid portions of the kernel, which latter portions are thus split into small pieces, rendering them more tender and palatable (when cooked) in connection with the milky juice in which the same is to be cooked. After the kernels are thus split longitudinally the ear of corn is pushed onward through the machine in the usual way, thus removing the corn from the cob.

As the present application is limited to the radial knives on the inside of the adjustable jaws, further description of the machine is not required, such machine being well known to men familiar with the art.

I am aware that the kernels of green corn have been split longitudinally before being removed from the cob; but I believe that my combination of devices above described is new.

Having thus described my invention, what I claim is—

In a green-corn cutter, a series of radial knives upon the inside of the adjustable jaws, for the purpose of splitting the crowns of the kernels of green corn or maize before the same are separated from the cob which is being pushed through or between said jaws, substantially as set forth.

The above specification of my said invention signed and witnessed, at Portland, this 12th day of September, A. D. 1879.

JOHN WINSLOW JONES.

Witnesses:
CHARLES P. MATTOCKS,
PHILIP J. GODFREY.